United States Patent
Abe (10) Patent No.: US 8,574,084 B2
(45) Date of Patent: Nov. 5, 2013

(54) VEHICLE-USE PROPELLER SHAFT

(75) Inventor: Takayuki Abe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 58 days.

(21) Appl. No.: 13/131,316

(22) PCT Filed: Dec. 10, 2008

(86) PCT No.: PCT/JP2008/072438
§ 371 (c)(1),
(2), (4) Date: May 26, 2011

(87) PCT Pub. No.: WO2010/067431
PCT Pub. Date: Jun. 17, 2010

(65) Prior Publication Data
US 2011/0230270 A1    Sep. 22, 2011

(51) Int. Cl.
*F16C 3/02* (2006.01)
*F16F 15/10* (2006.01)

(52) U.S. Cl.
USPC .......................................... 464/182; 403/337

(58) Field of Classification Search
USPC ........ 464/93–96, 98, 134, 138, 182; 403/335, 403/337
See application file for complete search history.

(56) References Cited

U.S. PATENT DOCUMENTS

| | | | |
|---|---|---|---|
| 5,979,594 A | 11/1999 | Doman | |
| 6,131,486 A | 10/2000 | Doman | |
| 7,559,845 B2 * | 7/2009 | Corey | .............................. 464/98 |
| 2003/0042083 A1 | 3/2003 | Berwanger | |

FOREIGN PATENT DOCUMENTS

| | | |
|---|---|---|
| JP | 57 59705 | 4/1982 |
| JP | 06-147216 | 5/1994 |
| JP | 6 87036 | 12/1994 |
| JP | 10 078083 | 3/1998 |
| JP | 2003 214456 | 7/2003 |
| JP | 2005 502005 | 1/2005 |
| JP | 2006 258253 | 9/2006 |
| JP | 2008 208919 | 9/2008 |

OTHER PUBLICATIONS

"Maximize Design of Ribs and Brackets." Atlas Foundry Company. Oct. 16, 2006, [online], [retrieved on Oct. 24, 2012] Retrieved from the Internet <URL: http://web.archive.org/web/20061016142740/http://www.atlasfdry.com/casting-design9.htm>.*
International Search Report issued Mar. 3, 2009 in PCT/JP08/072438 filed Dec. 10, 2008.

* cited by examiner

*Primary Examiner* — Gregory Binda
*Assistant Examiner* — Josh Skroupa
(74) *Attorney, Agent, or Firm* — Oblon, Spivak, McClelland, Maier & Neustadt, L.L.P.

(57) ABSTRACT

A vehicle-use propeller shaft includes a yoke having four arm portions to disposed at equal intervals in the circumferential direction, each arm portion extending outward in the radial direction. One pair of arm portions and that extend in opposite directions and the other pair of arm portions and that extend in opposite directions have mutually different shapes.

8 Claims, 7 Drawing Sheets

FIG.11 PRIOR ART

VEHICLE-USE PROPELLER SHAFT

TECHNICAL FIELD

The present invention relates to a vehicle-use propeller shaft that includes a yoke having arm portions that extend outward in the radial direction. In particular, the present invention relates to a technique for suppressing bending resonances that occur in the propeller shaft.

BACKGROUND ART

Conventionally, a structure is known in which a yoke at the axis end portion of a propeller shaft of a vehicle is connected to a flexible coupling (see Patent Literature 1, for example). With such a connecting structure of the propeller shaft, it is possible to transmit rotation torque by elastically connecting the propeller shaft and to absorb vibration and flexure by the flexible coupling.

The yoke of the propeller shaft disclosed in Patent Literature 1 includes three arm portions, each extending outward in the radial direction. The three arm portions are disposed at an interval of 120° in the circumferential direction. The arm portions of the yoke of the propeller shaft are connected on both sides of the flexible coupling with bolts and nuts, with the position of each arm portion being shifted by 60° from the opposing position thereof.

In addition to the propeller shaft described above, a propeller shaft is conventionally known that includes a yoke having four arm portions disposed at equal intervals in the circumferential direction.

Figure 11:
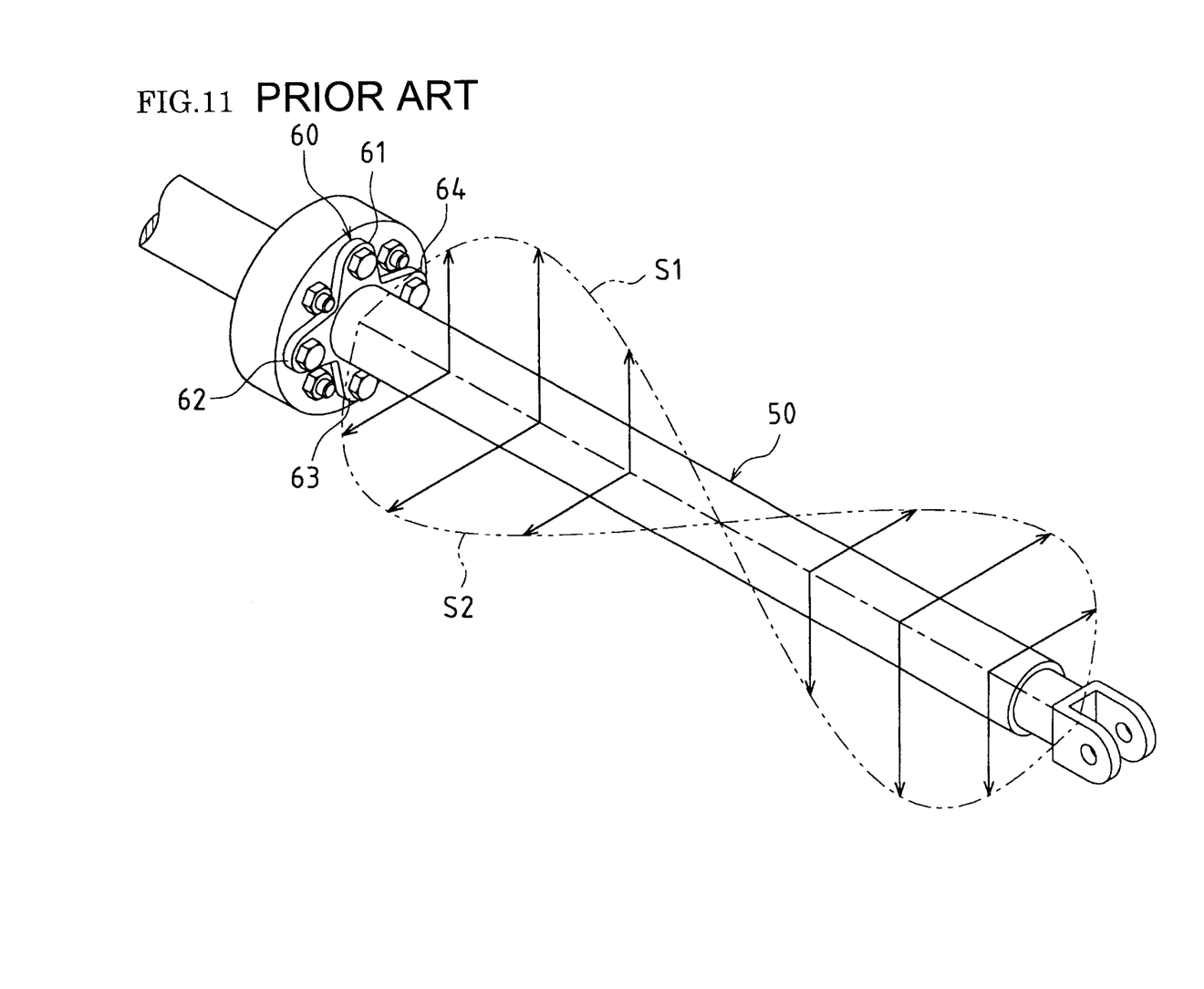

FIG. 11 is a schematic view showing an example of a propeller shaft 50 that includes, at an axis end portion thereof, a yoke 60 in which four arm portions 61 to 64 are provided at equal intervals in the circumferential direction. Each of the four arm portions 61 to 64 extends outward in the radial direction, and has the same shape.

CITATION LIST

Patent Literature

[PTL 1]
JP 2003-214456A

SUMMARY OF INVENTION

Technical Problem

Incidentally, in the case where the propeller shaft 50 that includes the yoke 60 as described above is provided in a vehicle and gear noise from the transmission or the like propagates to the propeller shaft 50, a bending resonance may occur in the propeller shaft 50. In this case, it is likely that a bending resonance (see the wave indicated by the reference numeral S1 in the drawing) along the extending direction of one pair of arm portions 61 and 63 (vertical direction in the drawing) that extend in opposite directions, and a bending resonance (see the wave indicated by the reference numeral S2 in the drawing) along the extending direction of the other pair of arm portions 62 and 64 (horizontal direction in the drawing) that extend in opposite directions, occur at the same time. There is an issue that when bending resonances in two directions occur at the same time, the bending vibration in the propeller shaft 50 as a whole becomes strong, and noise that propagates to the interior of a vehicle via the propeller shaft 50 increases.

The present invention has been achieved in view of such issues, and aims at providing a vehicle-use propeller shaft that includes a yoke having arm portions disposed at equal intervals in the circumferential direction, each arm portion extending outward in the radial direction, and that is capable of suppressing bending vibration.

Solution to Problem

In order to address the above issue, a vehicle-use propeller shaft of the present invention is configured as described below.

A vehicle-use propeller shaft of the present invention assumes a vehicle-use propeller shaft including a yoke having an even number, greater than or equal to four, of arm portions disposed at equal intervals in a circumferential direction, each arm portion extending outward in a radial direction, wherein any one pair of arm portions that extend in opposite directions and another pair of arm portions that extend in opposite directions have mutually different shapes.

With a vehicle-use propeller shaft as configured above, the one pair of arm portions and the other pair of arm portions have mutually different shapes, and therefore the one pair of arm portions and the other pair of arm portions have mutually different flexural rigidities in the thickness direction or mutually different masses, or mutually different flexural rigidities in the thickness direction and mutually different masses. As a result, the frequency of the bending resonance that occurs along the direction in which the one pair of arm portions extends and the frequency of the bending resonance that occurs along the direction in which the other pair of arm portions extends are mutually different. Thus, bending vibration is suppressed.

Also, in the vehicle-use propeller shaft, the shape of the any one pair of arm portions may differ from the shape of the other pair of arm portions due to the any one pair of arm portions and the other pair of arm portions having mutually different widths in the circumferential direction.

With such a vehicle-use propeller shaft, the any one pair of arm portions and the other pair of arm portions have mutually different flexural rigidities in the thickness direction, and therefore the frequency of the bending resonance that occurs along the direction in which the any one pair of arm portions extends and the frequency of the bending resonance that occurs along the direction in which the other pair of arm portions extends are mutually different. As a result, bending vibration is suppressed.

Also, in the vehicle-use propeller shaft, the shape of the any one pair of arm portions may differ from the shape of the other pair of arm portions due to the any one pair of arm portions having ribs for suppressing bending in a thickness direction, and the other pair of arm portions not having the ribs.

With such a vehicle-use propeller shaft, it is possible for the any one pair of arm portions and the other pair of arm portions to have greatly different rigidities in the thickness direction, while suppressing an increase in the mass. Thus, the frequency of the bending resonance that occurs along the direction in which the any one pair of arm portions extends can be greatly different from the frequency of the bending resonance that occurs along the direction in which the other pair of arm portions extends. As a result, bending vibration is suppressed.

Also, in the vehicle-use propeller shaft, the shape of the any one pair of arm portions may differ from the shape of the other pair of arm portions due to the any one pair of arm portions and the other pair of arm portions having mutually different thicknesses.

With such a vehicle-use propeller shaft, the any one pair of arm portions and the other pair of arm portions have mutually different flexural rigidities in the thickness direction. Thus, the frequency of the bending resonance that occurs along the direction in which the any one pair of arm portions extends differs from the frequency of the bending resonance that occurs along the direction in which the other pair of arm portions extends. As a result, bending vibration is suppressed.

Also, in the vehicle-use propeller shaft, the shape of the any one pair of arm portions may differ from the shape of the other pair of arm portions due to the any one pair of arm portions and the other pair of arm portions having mutually different widths in the circumferential direction at tip portions thereof.

With such a vehicle-use propeller shaft, it is possible to increase only the difference in the mass at the tip portion separated from the axis line between the any one pair of arm portions and the other pair of arm portions, without largely increasing the difference in the rigidity in the thickness direction. Thus, the frequency of the bending resonance that occurs along the direction in which the any one pair of arm portions extends can be made greatly different from the frequency of the bending resonance that occurs along the direction in which the other pair of arm portions extends. As a result, bending vibration is suppressed.

Also, in the vehicle-use propeller shaft, the shape of the any one pair of arm portions may differ from the shape of the other pair of arm portions due to the any one pair of arm portions and the other pair of arm portions having mutually different thicknesses at tip portions thereof.

With such a vehicle-use propeller shaft, it is possible to increase only the difference in the mass at the tip portion separated from the axis line between the any one pair of arm portions and the other pair of arm portions, without largely increasing the difference in the rigidity in the thickness direction. Thus, the frequency of the bending resonance that occurs along the direction in which the any one pair of arm portions extends can be made greatly different from the frequency of the bending resonance that occurs along the direction in which the other pair of arm portions extends. As a result, bending vibration is suppressed.

A vehicle-use propeller shaft of the present invention may assume a vehicle-use propeller shaft including a yoke having an even number, greater than or equal to four, of arm portions disposed at equal intervals in a circumferential direction, each arm portion extending outward in a radial direction, wherein any one pair of arm portions that extend in opposite directions and another pair of arm portions that extend in opposite directions have mutually different flexural rigidities in a thickness direction.

With a vehicle-use propeller shaft configured as described above, the one pair of arm portions and the other pair of arm portions have mutually different flexural rigidities in the thickness direction, and therefore the frequency of the bending resonance that occurs along the direction in which the one pair of arm portions extends and the frequency of the bending resonance that occurs along the direction in which the other pair of arm portions extends are mutually different. As a result, bending vibration is suppressed.

A vehicle-use propeller shaft of the present invention may assume a vehicle-use propeller shaft including a yoke having an even number, greater than or equal to four, of arm portions disposed at equal intervals in a circumferential direction, each arm portion extending outward in a radial direction, wherein any one pair of arm portions that extend in opposite directions and another pair of arm portions that extend in opposite directions have mutually different masses.

With a vehicle-use propeller shaft configured as described above, the one pair of arm portions and the other pair of arm portions have mutually different masses, and therefore the frequency of the bending resonance that occurs along the direction in which the one pair of arm portions extends and the frequency of the bending resonance that occurs along the direction in which the other pair of arm portions extends are mutually different. As a result, bending vibration is suppressed.

Advantageous Effects of Invention

According to the present invention, it is possible to suppress bending vibration that occurs in a vehicle-use propeller shaft that includes a yoke having arm portions disposed at equal intervals in the circumferential direction, each arm portion extending outward in the radial direction.

BRIEF DESCRIPTION OF DRAWINGS

FIG. 11 is a perspective view illustrating a conventional vehicle-use propeller shaft or the like.

DESCRIPTION OF EMBODIMENTS

First Embodiment

Figure 1:
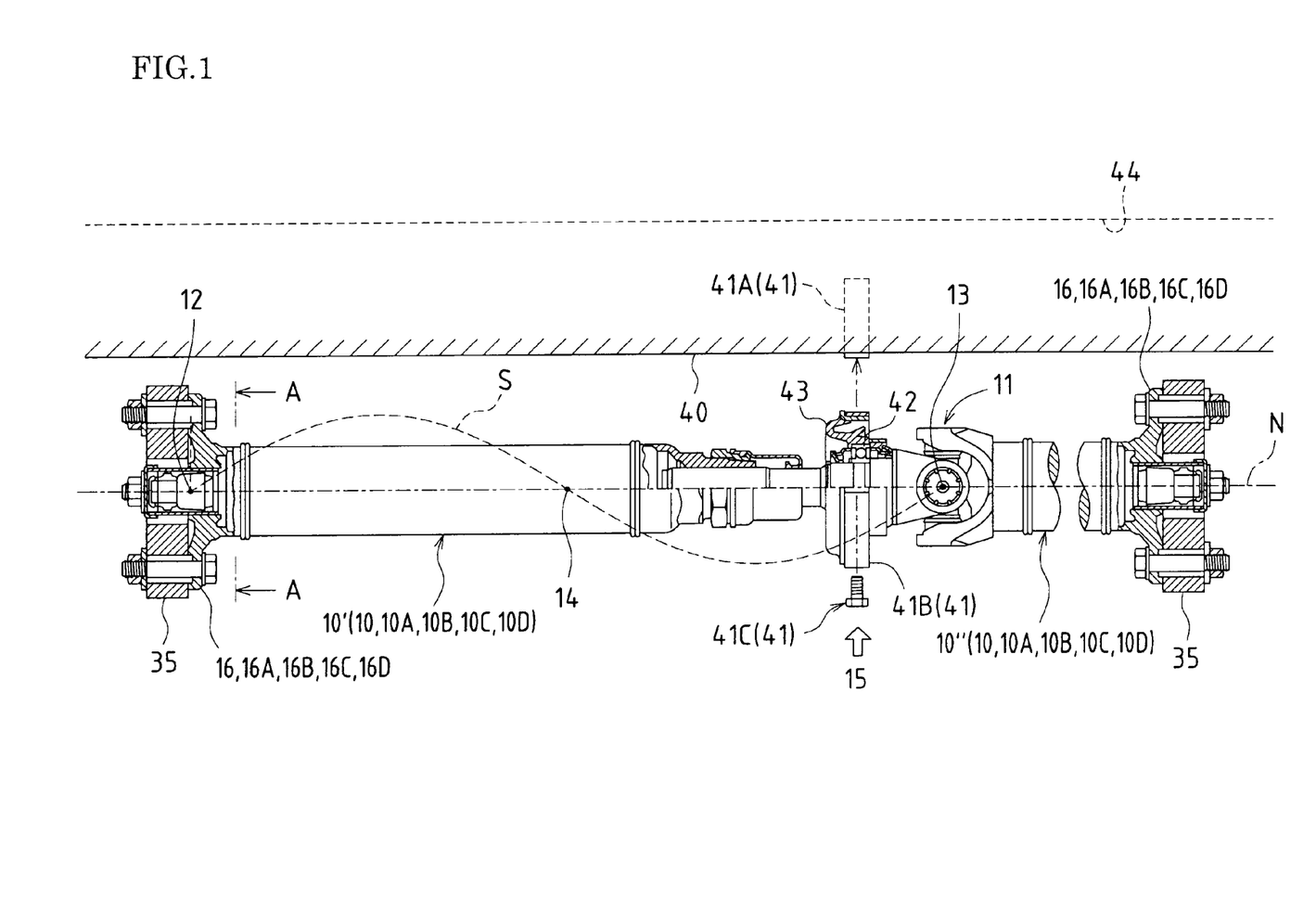
FIG. 1 is a diagram of a vehicle-use propeller shaft according to an embodiment of the present invention as viewed from a direction perpendicular to an axis line.

A first embodiment of the present invention will be described below. FIG. 1 is a diagram of a vehicle-use propeller shaft 10 (hereinafter simply referred to as a "propeller shaft 10") of the present invention as viewed from a direction perpendicular to an axis line N of the propeller shaft 10.

The propeller shaft 10 shown in FIG. 1 includes a front propeller shaft 10' connected to the transmission side and a rear propeller shaft 10" connected to the differential side.

These propeller shafts 10' and 10" are connected to each other via a universal joint 11 so as to be capable of integrally rotating.

The portion in the front propeller shaft 10' close to the universal joint 11 is supported by a vehicle chassis 40 with the use of a bracket 41. The bracket 41 is made up of an upper bracket 41A, a lower bracket 41B and a bolt 41C that fastens these, or the like. The bracket 41 allows the front propeller shaft 10' to be supported by the vehicle chassis 40 via rolling bearings 42 fitted to the outer circumferential portion of the front propeller shaft 10', and an annular rubber mount 43 fitted to the outer circumferential portion of the rolling bearings 42. At this time, the propeller shaft 10 and the like are arranged inside a tunnel portion 44 of the vehicle chassis 10.

The front propeller shaft 10' is connected to the transmission side (not shown in the drawings) via a flexible coupling 35 formed of an elastic material. The rear propeller shaft 10" is also connected to the differential gear side (not shown in the drawings) via a flexible coupling 35.

A bending resonance occurs in the front propeller shaft 10' and the rear propeller shaft 10" depending on the state of gear noise propagating from the transmission side or the differential side. In the lowest frequency range of gear noise, a bending resonance having two nodes occurs in each of the front propeller shaft 10' and the rear propeller shaft 10". The nodes of the bending resonance in this case are at the end portions of the front propeller shaft 10' and the end portions of the rear propeller shaft 10".

When the frequency rises, a bending resonance having three nodes occurs in each of the front propeller shaft 10' and the rear propeller shaft 10". The nodes of the bending resonance in this case are at the end portions and an intermediate portion of the front propeller shaft 10' and the end portions and an intermediate portion of the rear propeller shaft 10".

For example, as shown in the wave S in FIG. 1 (the wave in FIG. 1 is depicted exaggerated), when a three-node bending resonance occurs in the front propeller shaft 10', the nodes are at end portions 12 and 13 and an intermediate portion 14 of the front propeller shaft 10'. In this case, the support site where the propeller shaft 10' is supported by the vehicle chassis 40 via the bracket 41 (the site indicated by an arrow 15 in FIG. 1) is a little shifted from the node, and thus vibration (gear noise) propagates from the support site 15 to the vehicle chassis 40 (vehicle interior).

Figure 2A:
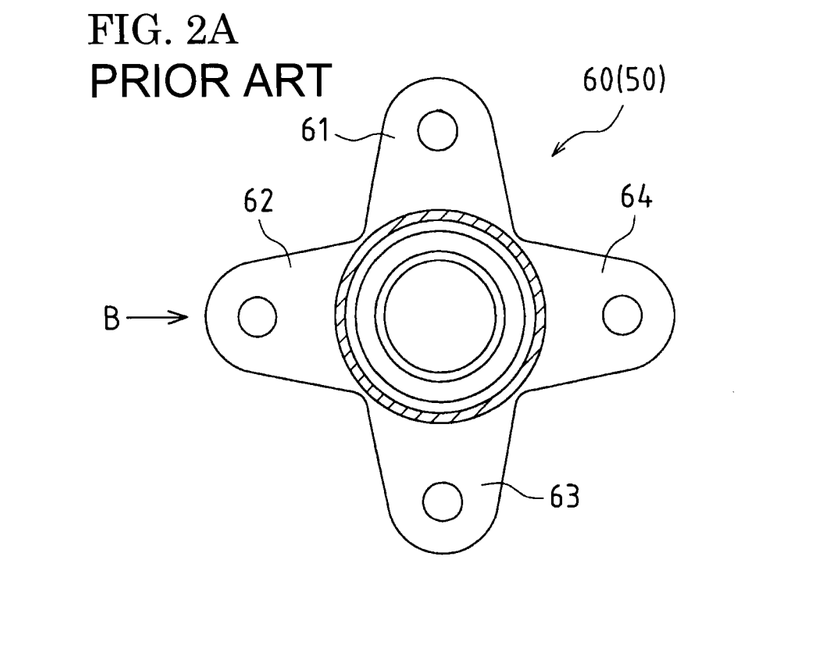
FIG. 2(a) is a diagram of a conventional yoke of a vehicle-use propeller shaft as viewed from the axis line direction.
Figure 2B:
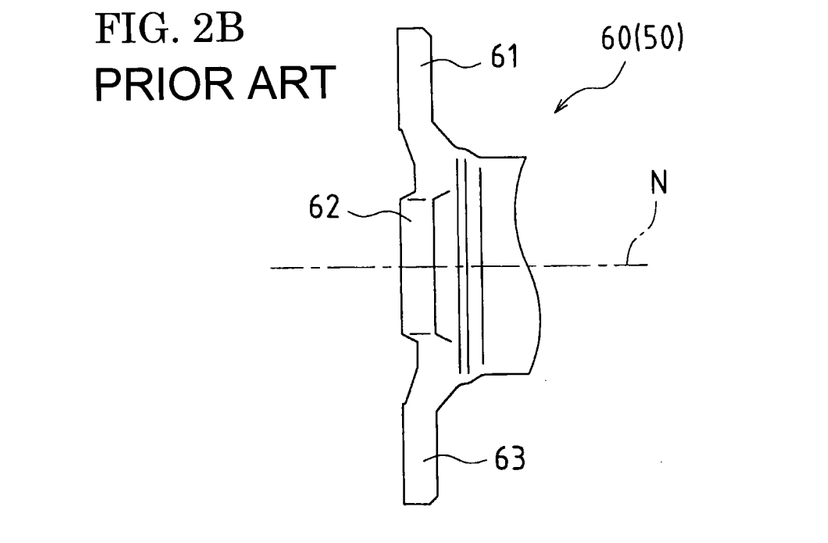
FIG. 2(b) is a diagram showing FIG. 2(a) as viewed from the arrow B in FIG. 2(a).

Next, characteristic portions of the propeller shaft 10 of the present invention will be described. Note that in the below description, the characteristic portions are described through a comparison with a conventional propeller shaft 50 shown in FIG. 2. FIG. 2(*a*) is a diagram mainly showing a yoke 60 as viewed from the direction of an axis line N. FIG. 2(*b*) is a diagram showing FIG. 2(*a*) as viewed from the arrow B in FIG. 2(*a*). As shown in FIG. 2, in the conventional yoke 60 of the propeller shaft 50, arm portions 61 to 64 are disposed at equal intervals in the circumferential direction, each arm portion extending outward in the radial direction, and have the same shape. Therefore, the four arm portions 61 to 64 have the same flexural rigidity in the thickness direction. In addition, the four arm portions 61 to 64 have the same mass.

Figure 3:
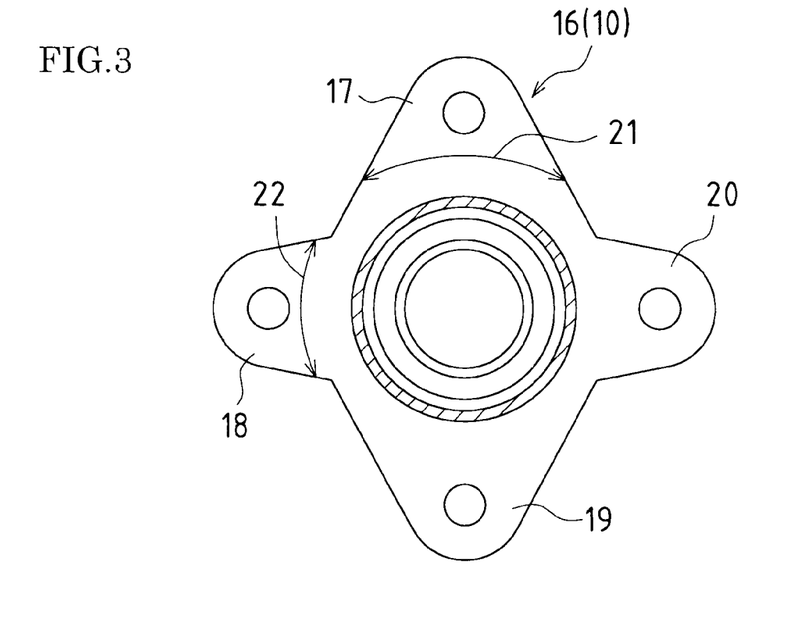
FIG. 3 is a cross-sectional view taken along the line A-A in FIG. 1, and mainly shows a yoke.

FIG. 3 is a cross-sectional view taken along the line A-A in FIG. 1, and shows a yoke 16 as viewed from the direction of the axis line N. As shown in FIG. 3, in the propeller shaft 10 according to the present invention as well, four arm portions 17 to 20 are disposed at equal intervals in the circumferential direction, each arm portion extending outward in the radial direction. However, among the four arm portions 17 to 20 of the propeller shaft 10, one pair of arm portions 17 and 19 that extend in opposite directions (extend in the vertical direction in FIG. 3) and the other pair of arm portions 18 and 20 that extend in opposite directions (extend in the horizontal direction in FIG. 3) have mutually different shapes. Specifically, although the arm portions 17 and 19 and the arm portions 18 and 20 have a common thickness (thickness in the direction of the axis line N), the arm portions 17 and 19 and the arm portions 18 and 20 have different widths 21 and 22 in the circumferential direction. As a result, with respect to the one pair of arm portions 17 and 19 and the other pair of arm portions 18 and 20, the arm portions 17 and 19 have a greater flexural rigidity in the thickness direction than the arm portions 18 and 20.

Incidentally, as described above, bending resonances occur in the propeller shaft 10 along the extending directions of the respective pairs of arm portions that extend in opposite directions. For this reason, the frequency of the bending resonance that occurs in the propeller shaft 10 depends on the flexural rigidity in the thickness direction of the arm portions 17 to 20.

In the propeller shaft 10, the one pair of arm portions 17 and 19 extending in opposite directions and the other pair of arm portions 18 and 20 extending in opposite directions have mutually different flexural rigidities in the thickness direction. Thus, the frequency of the bending resonance that occurs along the direction in which the arm portions 17 and 19 extend is different from the frequency of the bending resonance that occurs along the direction in which the arm portions 18 and 20 extend, and thus the bending vibration that occurs in the propeller shaft 10 is suppressed.

Based on the above description, a vehicle in which the propeller shaft 10 of the present invention is mounted can suppress gear noise that propagates to the vehicle interior via the propeller shaft 10 to a low level.

Figure 4:
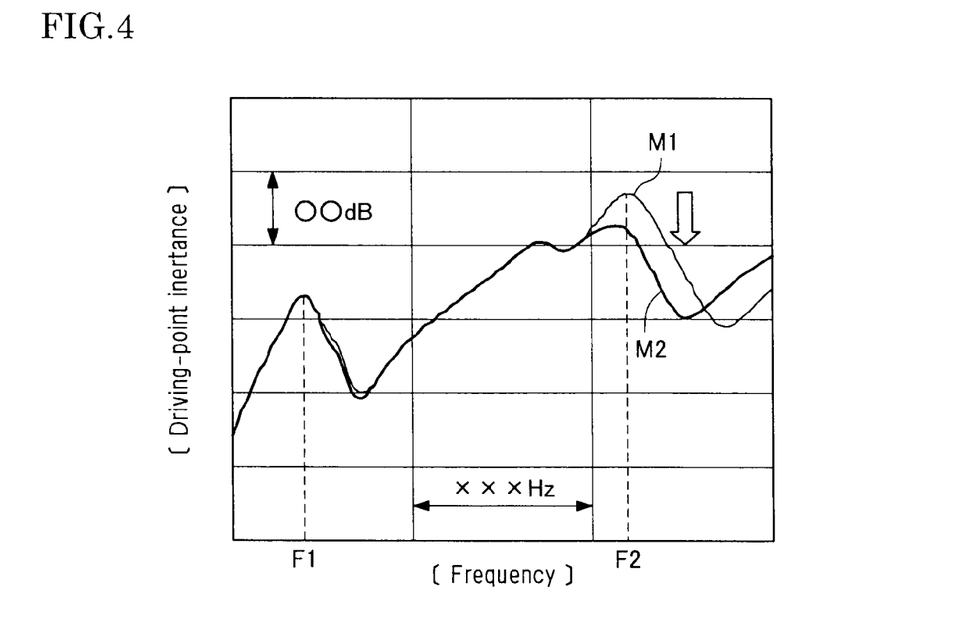
FIG. 4 is a graph showing FEM calculation results of the driving-point inertance with respect to a vehicle-use propeller shaft of the present invention and a conventional vehicle-use propeller shaft.

FIG. 4 shows the result of the driving-point inertance calculated by FEM, the results having been obtained by preparing two types of FEM models of the propeller shaft, and exciting a prescribed position in the propeller shaft of these models. The horizontal axis in FIG. 4 indicates the frequency of the bending vibration, and the vertical axis in FIG. 4 indicates the driving-point inertance.

The two types of modeled propeller shafts each have, in an axis end portion thereof, four arm portions each extending outward in the radial direction. Also, the four arm portions are disposed at equal intervals of 90° in the circumferential direction. However, in one of the propeller shaft models (hereinafter referred to as a "model M1"), the four arm portions have the same flexural rigidity in the thickness direction, whereas in the other propeller shaft model (hereinafter referred to as a "model M2"), one pair of arm portions extending in opposite directions and the other pair of arm portions extending in opposite directions have mutually different flexural rigidities in the thickness direction.

In the FEM calculation results in FIG. 4, reference numerals M1 and M2 respectively show the calculation results of the model M1 and the model M2. As indicated by the calculation results, in both of the models M1 and M2, peak values of the driving-point inertance appear in the vicinity of frequencies F1 and F2. A two-node bending resonance occurs in the vicinity of the frequency F1, and a three-node bending resonance occurs in the vicinity of the frequency F2.

Although the models M1 and M2 have an equivalent peak value of the driving-point inertance in the vicinity of the frequency F1, at the frequency F2, the peak value of the driving-point inertance of the model M2 is greatly lower than that of the model M1.

That is, the FEM calculation results show that the peak value of the three-node bending resonance is more suppressed in the propeller shaft of the present invention corresponding to the model M2 than in the conventional propeller shaft corresponding to the model M1.

Generally, with respect to the propeller shaft mounted in vehicles, the frequency range in which the three-node bending resonance occurs tends to be regarded as more problematic in terms of noise in the vehicle interior than the frequency range in which the two-node bending resonance occurs. Therefore, with the propeller shaft of the present invention corresponding to the model M2, it is possible to effectively suppress vibration and noise that propagates to the vehicle interior.

Second Embodiment

Next, a second embodiment of the present invention will be described. Note that description of configurations similar to those of the propeller shaft 10 of the first embodiment is omitted, and description will be made mainly on differences.

Figure 5:
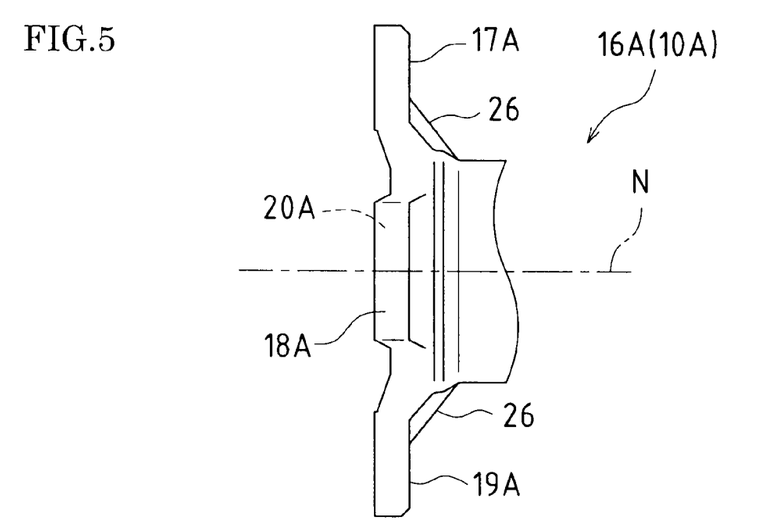
FIG. 5 is a diagram of a yoke of a vehicle-use propeller shaft according to a second embodiment of the present invention as viewed from a direction perpendicular to an axis line.

As illustrated in FIG. 5, also in a yoke 16A of a propeller shaft 10A according to the second embodiment, one pair of arm portions 17A and 19A that extend in opposite directions and another pair of arm portions 18A and 20A that extend in opposite directions (in FIG. 5, the arm portion 20A is hidden on the rear side) have mutually different shapes. Specifically, one difference of the yoke 16A of the propeller shaft 10A according to the second embodiment is that although the one pair of arm portions 17A and 19A has ribs 26 for suppressing bending in the thickness direction, the other pair of arm portions 18A and 20A does not have the ribs 26. In this manner, the one pair of arm portions 17A and 19A and the other pair of arm portions 18A and 20A have mutually different flexural rigidities in the thickness direction.

As a result, with the propeller shaft 10A according to the second embodiment as well, the peak value of the three-node bending resonance can be suppressed more than with the conventional propeller shaft.

Third Embodiment

Next, a third embodiment of the present invention will be described. Note that description of configurations similar to those of the propeller shaft 10 of the first embodiment is omitted, and description will be made mainly on differences.

Figure 6:
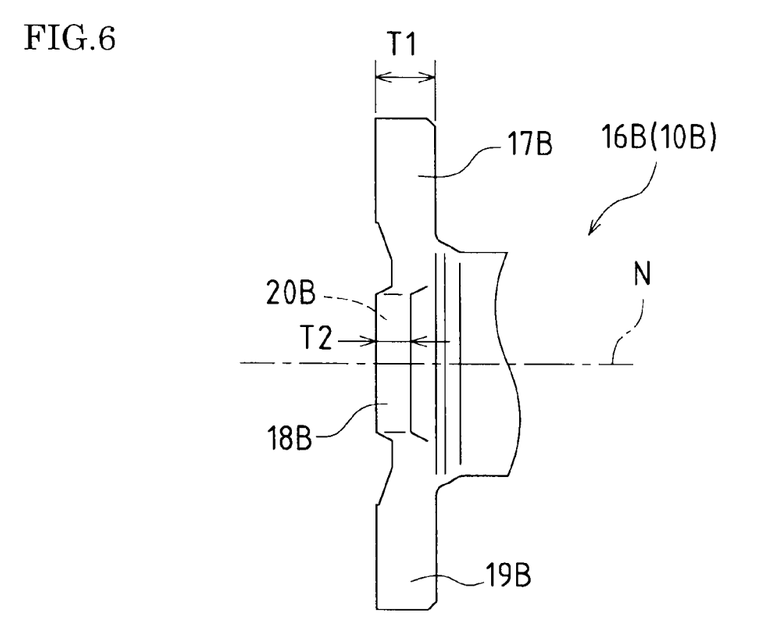
FIG. 6 is a diagram of a yoke of a vehicle-use propeller shaft according to a third embodiment of the present invention as viewed from a direction perpendicular to an axis line.

As illustrated in FIG. 6, also in a yoke 16B of a propeller shaft 10B according to the third embodiment, one pair of arm portions 17B and 19B that extend in opposite directions and another pair of arm portions 18B and 20B that extend in opposite directions (in FIG. 6, the arm portion 20B is hidden on the rear side) have mutually different shapes. Specifically, in the yoke 16B of the propeller shaft 10B according to the third embodiment, although the one pair of arm portions 17B and 19B and the other pair of arm portions 18B and 20B have the same width in the circumferential direction, a thickness T1 (thickness in the direction of the axis line N) of the one pair of arm portions 17B and 19B is different from a thickness T2 of the other pair of arm portions 18B and 20B. As a result, the one pair of arm portions 17B and 19B and the other pair of arm portions 18B and 20B have mutually different flexural rigidities in the thickness direction.

As a result, with the propeller shaft 10B according to the third embodiment as well, the peak value of the three-node bending resonance can be suppressed more than with the conventional propeller shaft.

Fourth Embodiment

Next, a fourth embodiment of the present invention will be described. Note that description of configurations similar to those of the propeller shaft 10 of the first embodiment is omitted, and description will be made mainly on differences.

Figure 7:
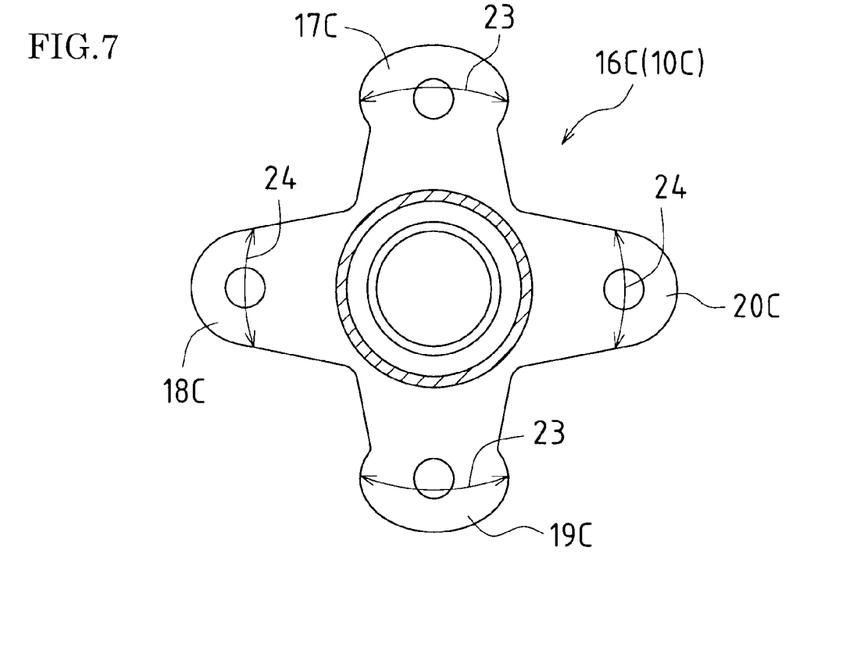
FIG. 7 is a cross-sectional view taken along the line A-A in FIG. 1, and shows a yoke according to a fourth embodiment.

As illustrated in FIG. 7, also in a yoke 16C of a propeller shaft 10C according to the fourth embodiment, one pair of arm portions 17C and 19C that extend in opposite directions and another pair of arm portions 18C and 20C that extend in opposite directions have mutually different shapes. Specifically, in the yoke 16C of the propeller shaft 10C according to the fourth embodiment, although the one pair of arm portions 17C and 19C and the other pair of arm portions 18C and 20C have the same thickness, widths 23 and 24 in the circumferential direction at the tip portions thereof differ from each other. As a result, the one pair of arm portions 17C and 19C and the other pair of arm portions 18C and 20C have mutually different masses at the tip portions thereof.

Incidentally, as already stated, bending resonances occur in the propeller shaft 10 along the extending directions of the respective pairs of arm portions that extend in opposite directions. For this reason, the frequencies of two bending resonances that occur in the propeller shaft 10C depend on the mass of the arm portions 17C to 20C.

In the propeller shaft 10C, the one pair of arm portions 17C and 19C that extend in opposite directions and the other pair of arm portions 18C and 20C that extend in opposite directions have mutually different masses. Accordingly, the frequency of the bending resonance that occurs along the direction in which the arm portions 17C and 19C extend is different from the frequency of the bending resonance that occurs along the direction in which arm portions 18C and 20C extend. As a result, the bending vibration occurring in the propeller shaft 10 is suppressed.

Consequently, a vehicle in which the propeller shaft 10C according to this embodiment is mounted can suppress gear noise that propagates to the vehicle interior via the propeller shaft 10C to a low level.

Figure 8:
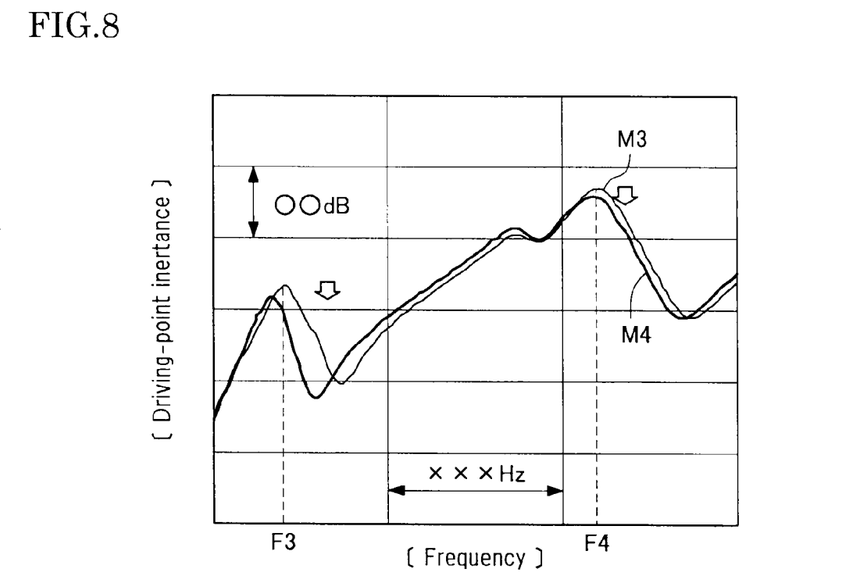
FIG. 8 is a graph showing FEM calculation results of the driving-point inertance with respect to a vehicle-use propeller shaft of the present invention and a conventional vehicle-use propeller shaft.

FIG. 8 shows the result of the driving-point inertance calculated by FEM, the results having been obtained by preparing two types of FEM models of the propeller shaft, and exciting a prescribed position in the propeller shaft of these models. The horizontal axis in FIG. 8 indicates the frequency of the bending vibration, and the vertical axis in FIG. 8 indicates the driving-point inertance.

The two types of modeled propeller shafts each have, in the axis end portion thereof, four arm portions each extending outward in the radial direction. Also, the four arm portions are disposed at equal intervals of 90° in the circumferential direction. However, while the four arm portions have the same mass in one of the propeller shaft models (hereinafter referred to as a "model M3"), in the other propeller shaft model (hereinafter referred to as a "model M4"), one pair of arm portions and the other pair of arm portions have mutually different masses at the tip portions thereof.

In the FEM calculation results in FIG. 8, reference numerals M3 and M4 respectively show the calculation results of the model M3 and the model M4. As indicated by the calculation results, in both of the models M3 and M4, peak values of the driving-point inertance appear in the vicinity of frequencies F3 and F4. That is, a two-node bending resonance occurs in the vicinity of the frequency F3 and a three-node bending resonance occurs in the vicinity of the frequency F4.

However, in the vicinity of both of the frequencies F3 and F4, the model M4 has lower peak values of the driving-point inertance than the model M3.

That is, the FEM calculation results show that the peak values of the two-node bending resonance and the three-node bending resonance are more suppressed in the propeller shaft of the present invention corresponding to the model M4 than in the conventional propeller shaft corresponding to the model M3.

Therefore, with the propeller shaft of the present invention corresponding to the model M4, the two-node bending resonance and the three-node bending resonance are suppressed, and consequently it is possible to also suppress noise that propagates to the vehicle interior due to the resonance.

Fifth Embodiment

Next, a fifth embodiment of the present invention will be described. Note that description of configurations similar to those of the propeller shaft 10C of the fourth embodiment is omitted, and description will be made mainly on differences.

Figure 9:
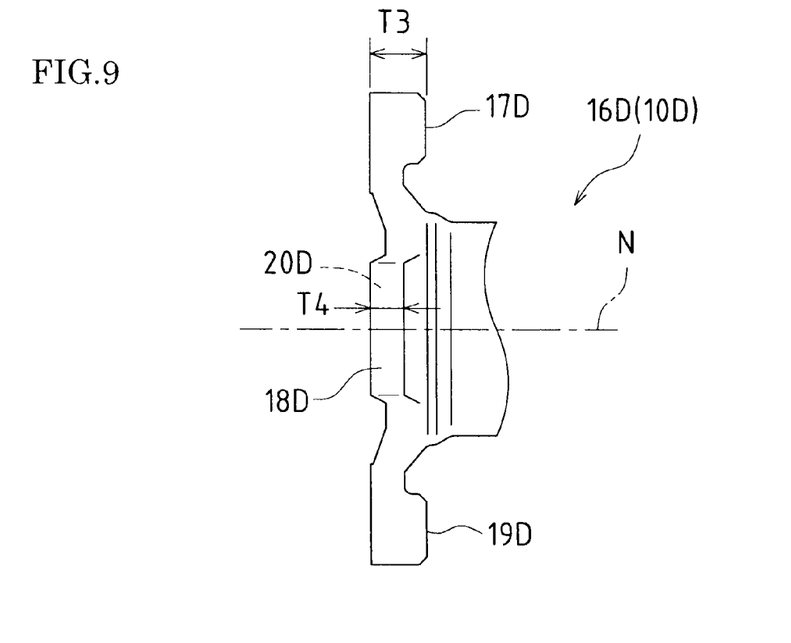
FIG. 9 is a diagram of a yoke of a vehicle-use propeller shaft according to a fifth embodiment of the present invention as viewed from a direction perpendicular to an axis line.

As illustrated in FIG. 9, also in a yoke 16D of a propeller shaft 10D according to the fifth embodiment, one pair of arm portions 17D and 19D that extend in opposite directions and another pair of arm portions 18D and 20D that extend in opposite directions (in FIG. 9, the arm portion 20D is hidden on the rear side) have mutually different shapes. Specifically, in the yoke 16D of the propeller shaft 10D according to the fifth embodiment, although the one pair of arm portions 17D and 19D and the other pair of arm portions 18D and 20D have the same width in the circumferential direction, the pairs have a different a thickness T3 and a thickness T4, respectively, at the tip portions thereof. As a result, the mass, in particular, the mass of the tip portion, differs between the one pair of arm portions 17D and 19D and the other pair of arm portions 18D and 20D.

As a result, with the propeller shaft 10D according to the fifth embodiment as well, the peak value of the two-node bending resonance and the three-node bending resonance can be more suppressed than with the conventional propeller shaft.

Other Embodiments

In the FEM calculation results described above, description was made for two cases, namely the case in which one pair of arm portions that extend in opposite directions and the other pair of arm portions that extend in opposite directions have mutually different flexural rigidities in the thickness direction, and the case in which these pairs have mutually different masses.

Of course, it is possible to further suppress the bending resonance by causing both the flexural rigidity in the thickness direction and the mass of the respective pairs to be different. FEM calculation was performed for such a case as well.

Figure 10:
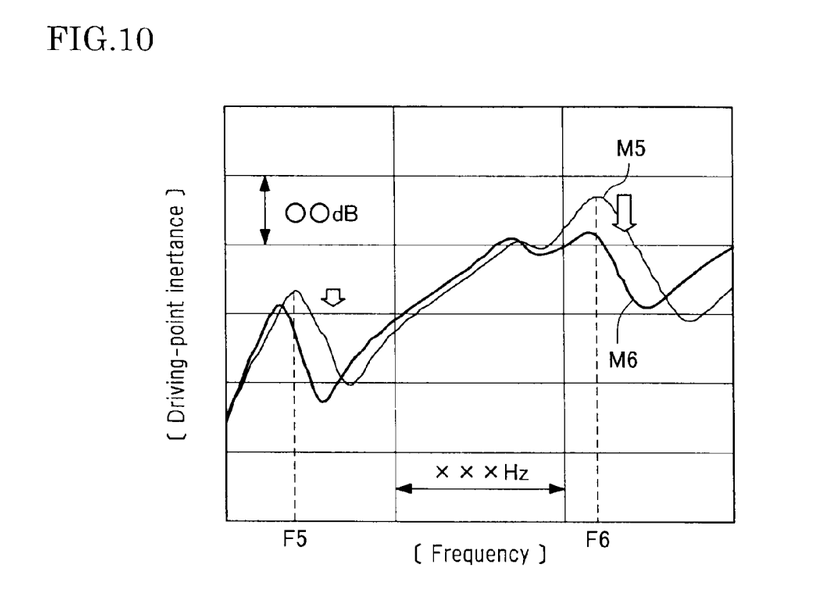
FIG. 10 is a graph showing FEM calculation results of the driving-point inertance with respect to a vehicle-use propeller shaft of the present invention and a conventional vehicle-use propeller shaft.

FIG. 10 shows the results of the FEM calculation in this case. In FIG. 10, the horizontal axis indicates the frequency of the bending vibration, and the vertical axis indicates the driving-point inertance.

The calculation results indicated by the reference numerals M5 and M6 are results of propeller shaft models that each include, at an axis end portion, four arm portions extending outward in the radial direction. Reference numeral M5 is the calculation result of the model in which the four arm portions have the same flexural rigidity in the thickness direction and the same mass.

In contrast, the reference numeral M6 is the calculation result of the model in which one pair of arm portions extending in opposite directions and the other pair of arm portions extending in opposite directions have mutually different flexural rigidities in the thickness direction and different masses at the tip portions thereof.

As indicated by the FEM calculation results in FIG. 10, in both of the models M5 and M6, peak values of the driving-point inertance appear in the vicinity of frequencies F5 and F6. In other words, a two-node bending resonance occurs at the frequency F5, and a three-node bending resonance occurs at the frequency F6. In the vicinity of both of the frequencies F5 and F6, the model M6 has a lower peak value of the driving-point inertance than the model M5.

That is, the FEM calculation results show that the peak values of the two-node bending resonance and the three-node bending resonance are more suppressed in the propeller shaft of the present invention corresponding to the model M6 than in the conventional propeller shaft corresponding to the model M5.

Therefore, with the propeller shaft of the present invention corresponding to the model M6, the two-node bending resonance and the three-node bending resonance are suppressed, and consequently it is possible to also suppress noise that propagates to the vehicle interior due to the resonance.

Note that in the embodiments described above, although a structure in which the yoke of the propeller shaft of the present invention is connected to the flexible coupling formed as an elastic body is described as an example, a coupling formed as a rigid body may be used in place of the flexible coupling. An effect of suppressing the bending resonance can be achieved in this case as well.

In the embodiments described above, although a propeller shaft that includes a yoke having four arm portions is described as an example, a configuration may be such that the number of the arm portions of the yoke disposed at equal intervals in the circumferential direction is an even number greater than or equal to four, and any one pair of arm portions that extend in opposite directions and another pair of arm portions that extend in opposite directions have mutually different shapes. With such a configuration as well, an effect of suppressing bending resonances can be achieved.

INDUSTRIAL APPLICABILITY

The present invention can be applied to, for example, a propeller shaft for transmitting driving force between the transmission and the differential in a vehicle such as an automobile.

REFERENCE SIGNS LIST 10, 10A to 10D Vehicle-use Propeller Shaft
17, 17A to 17D, 19, 19A to 19D Arm Portion
18, 18A to 18D, 20, 20A to 20D Arm Portion
26 Rib

The invention claimed is:

1. A vehicle-use propeller shaft comprising:
a yoke having an even number, greater than or equal to four, of arm portions disposed at equal intervals in a circumferential direction of the propeller shaft, each arm portion extending outward in a radial direction,
wherein the yoke and the arm portions are integrally formed, and
wherein any one pair of arm portions that extend in opposite directions and another pair of arm portions that extend in opposite directions have mutually different shapes.

2. The vehicle-use propeller shaft according to claim 1, wherein the shape of the any one pair of arm portions differs from the shape of the other pair of arm portions due to the any one pair of arm portions and the other pair of arm portions having mutually different widths in the circumferential direction.

3. The vehicle-use propeller shaft according to claim 1, wherein the shape of the any one pair of arm portions differs from the shape of the other pair of arm portions due to the any one pair of arm portions having ribs for suppressing bending in a thickness direction, and the other pair of arm portions not having the ribs.

4. The vehicle-use propeller shaft according to claim 1, wherein the shape of the any one pair of arm portions differs from the shape of the other pair of arm portions due to the any one pair of arm portions and the other pair of arm portions having mutually different thicknesses.

5. The vehicle-use propeller shaft according to claim 1, wherein the shape of the any one pair of arm portions differs from the shape of the other pair of arm portions due to the any one pair of arm portions and the other pair of arm portions having mutually different widths in the circumferential direction at tip portions thereof.

6. The vehicle-use propeller shaft according to claim 1, wherein the shape of the any one pair of arm portions differs from the shape of the other pair of arm portions due to the any one pair of arm portions and the other pair of arm portions having mutually different thicknesses at tip portions thereof.

7. A vehicle-use propeller shaft comprising:

a yoke having an even number, greater than or equal to four, of arm portions disposed at equal intervals in a circumferential direction of the propeller shaft, each arm portion extending outward in a radial direction, wherein the yoke and the arm portions are integrally formed, and wherein any one pair of arm portions that extend in opposite directions and another pair of arm portions that extend in opposite directions have mutually different flexural rigidities in a thickness direction.

8. A vehicle-use propeller shaft comprising:

a yoke having an even number, greater than or equal to four, of arm portions disposed at equal intervals in a circumferential direction of the propeller shaft, each arm portion extending outward in a radial direction, wherein the yoke and the arm portions are integrally formed, and wherein any one pair of arm portions that extend in opposite directions and another pair of arm portions that extend in opposite directions have mutually different masses.

\* \* \* \* \*